L. T. HOUGHTON.

Heating-Drum.

No. 8,329. Reissued July 9, 1878.

WITNESSES:

C. Neveux

C. Sedgwick

INVENTOR:

L. T. Houghton

BY Munn & Co.

ATTORNEYS.

UNITED STATES PATENT OFFICE.

LEWIS T. HOUGHTON, OF WORCESTER, MASSACHUSETTS.

IMPROVEMENT IN HEATING-DRUMS.

Specification forming part of Letters Patent No. 166,461, dated August 10, 1875; Reissue No. 8,329, dated July 9, 1878; application filed June 1, 1878.

*To all whom it may concern:*

Figure 1:
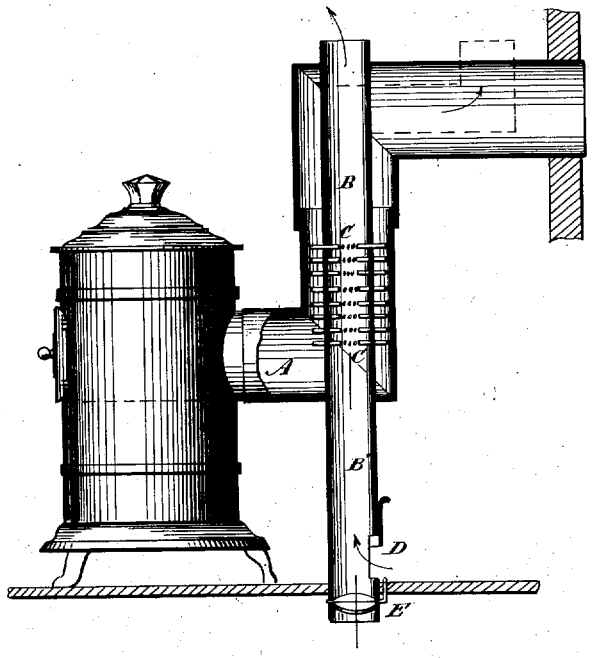
Figure 2:
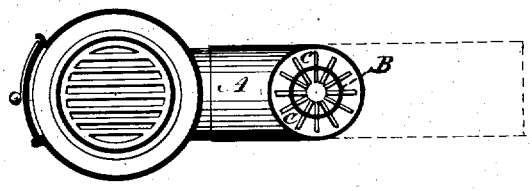

Be it known that I, LEWIS T. HOUGHTON, of Worcester, in the county of Worcester and State of Massachusetts, have invented a new and Improved Smoke-Flue, of which the following is a specification:

Figure 1 is a side elevation of an ordinary stove having attached to it my improved smoke-flue, which is shown in section. Fig. 2 is a horizontal section.

Similar letters of reference indicate corresponding parts.

The object of my invention is to economize heat and at the same time provide a means of heating which will afford a continuous supply of fresh air without affecting the temperature of the apartment in which the stove is placed.

My invention is an improvement in means for ventilation of buildings, whereby fresh air is supplied in a heated condition to one or more apartments thereof.

The improvement relates to the construction and arrangement of parts, as hereinafter described and claimed.

Referring to the drawing, A is a smoke-flue, attached to the stove and extending to the chimney in the usual way. A pipe, B, which is smaller in diameter than the pipe A, extends through the said pipe longitudinally, and is connected with a pipe, B′, which extends downward through the floor of the apartment in which the stove is placed, or is otherwise placed in communication with the external air.

The upper end of the pipe B opens into the apartment, and its lower end is provided with a damper, E, by which it may be entirely closed, and with a side opening near the floor, which may be closed by a damper, D. Air entering the lower end of the pipe B becomes rarefied, and is discharged into the apartment, or it may, if desired, be conducted to a floor above.

To render the pipe B more efficient in extracting heat from the gases escaping through the smoke-flue, a number of pins, C, are inserted radially, and project from its outer and inner surface.

It will be observed that the air to be heated may be taken from the lower part of the apartment by shutting the damper E and opening the damper D.

Having thus described my invention, I claim as new and desire to secure by Letters Patent—

The combination, with a flue, A, attached to a stove, of the air-supply pipe B B′, extending through the same, and communicating with the outer air, and provided with a damper and radiators, substantially as shown and described, for the purpose specified.

LEWIS T. HOUGHTON.

Witnesses:
JEHIEL TODD,
B. W. POTTER.